United States Patent [19]

Schorn

[11] Patent Number: 5,047,752
[45] Date of Patent: Sep. 10, 1991

[54] SAFETY SYSTEM FOR A MACHINE TOOL

[75] Inventor: Gerard J. Schorn, Southampton, Pa.

[73] Assignee: Murata Wiedemann, Inc., King of Prussia, Pa.

[21] Appl. No.: 436,420

[22] Filed: Nov. 14, 1989

[51] Int. Cl.[5] ............................................. G08B 21/00
[52] U.S. Cl. ....................... 340/680; 367/93; 192/129 A; 340/552
[58] Field of Search ...................... 340/556, 680, 552; 367/93; 361/179; 307/116, 117; 192/129 A

[56] References Cited

U.S. PATENT DOCUMENTS

| | | | |
|---|---|---|---|
| 3,876,969 | 4/1975 | Price, Jr. | 367/93 X |
| 3,942,601 | 3/1976 | Smith | 367/93 X |
| 4,120,389 | 10/1978 | Erickson | 367/93 X |
| 4,408,195 | 10/1983 | Tullis et al. | 340/685 |
| 4,910,464 | 3/1990 | Trett et al. | 340/552 X |

*Primary Examiner*—Joseph A. Orsino
*Assistant Examiner*—Jeffery A. Hofsass
*Attorney, Agent, or Firm*—John R. Benefiel

[57] ABSTRACT

A safety system for a machine tools having a powered feed table in which ultrasonic transmitters and receivers are arrayed on the leading, trailing and lateral sides of the table establishing moving protected zones so that if an operator enters the zones, the machine is shut down only if the table has moved close to the person in that zone. A failsafe feature causes shutdown in the event of failure of any of the safety system components.

7 Claims, 4 Drawing Sheets

SAFETY SYSTEM FOR A MACHINE TOOL

This invention concerns machine tools such as punch presses or laser/plasma cutting machines having high speed powered X-Y feed tables for moving workpieces into the machining area.

The rapid powered movements of such feed tables present a hazard to operating and other shop personnel, and there has heretofore been developed safety mat systems causing a shut down of the press and powering of the table if a person entered certain zones where the possibility of a collision with the table existed.

Safety mats have several operational disadvantages, such as being subject to damage from dropped tools, and are difficult to keep clean. Safety mats also have the disadvantage of creating a high incidence of false trips when an operator or other personnel enters a protected zone and the machine is shut down when in fact the table is in a withdrawn position, and not in an advanced position, liable to injure the person. Such zones are established in areas alongside the machine when an operator normally performs loading or tool replacement tasks, and hence the incidence of false trips significantly affects the efficiency of the operation, as the machine cycle must be restarted after a false trip.

SUMMARY OF THE INVENTION

The present invention is a safety system for machine tools having a movable table in which an array of ultrasonic transmitter-receiver units are attached to the movable table and possibly also to fixed structure opposite the table. The safety system reacts only to echo signals received from a person or object standing within a limited distance from the sensors on the table, substantially less than the range of movement of the table, so that a shifting zone of protection adjacent the machine is established with respect to the table.

Two sets of transmitter-receivers are utilized, a first set in a "pinch" zone where there is a possibility of trapping personnel between the moving table and facing fixed structure opposite the leading edge of the table, a second set of ultrasonic transmitter-receivers installed where only a collision hazard is presented. A more drastic machine shutdown occurs when a transmitter-receiver in the first set is triggered as compared with the triggering of a transmitter-receiver in a second set.

A failsafe system shuts down the machine if there is any failure of the transmitter receivers or elsewhere in the control system.

DETAILED DESCRIPTION

Figure 1:
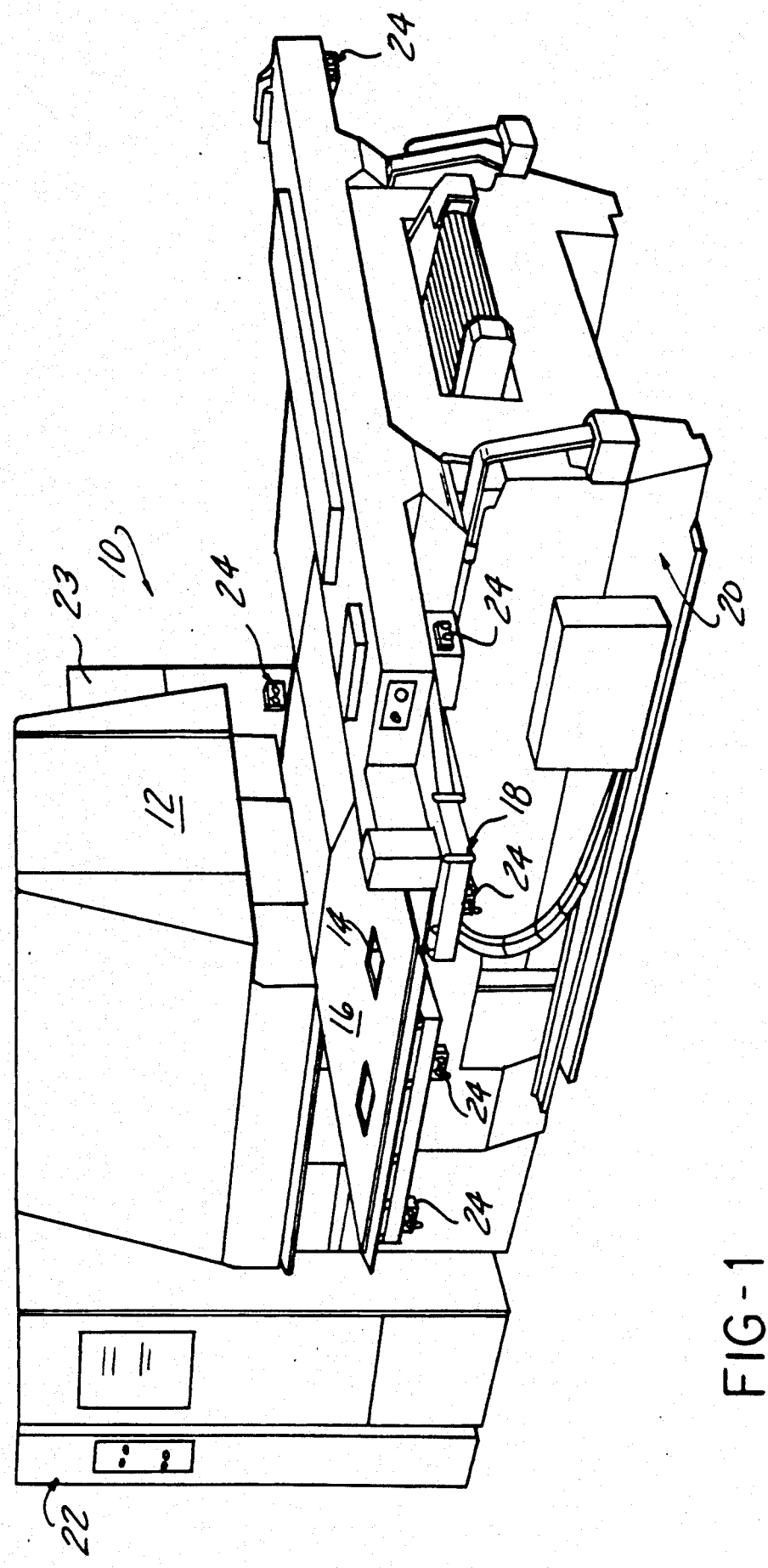
FIG. 1 is a fragmentary perspective view of a punch press having a safety system according to the present invention installed thereon.

Referring to FIG. 1, a typical machine tool such as a punch press 10 is shown, having a punch head 12 containing tooling, such as punches and dies mounted on rotary turrets, for punching openings 14 in a workpiece 16, in conventional fashion.

The punch press 10 includes a movable table 18 supported for powered movement on a base 20 to carry the workpiece 14 to and from the punch head 12 for presenting selected areas of the workpiece 16 to the tooling. The table 18 also includes means for shifting the workpiece 16 side to side on the table 18 for this same purpose. Certain other fixed structures, such as a control panel 22 and electrical enclosures 23 are commonly located adjacent the punch press 10. This arrangement is conventional, and thus will not here be described in further detail.

According to the concept of the present invention, limited range ultrasonic transmitter-receiver units 24 are fixed to the table 18 at spaced locations adjacent certain zones around the perimeter of the table 18 and punch press 10. These locations are on the trailing side of the table 18, the loading side, and the leading side of the table 18 as well as, optionally, on a forward facing surface of the fixed structure 22.

Figure 2:
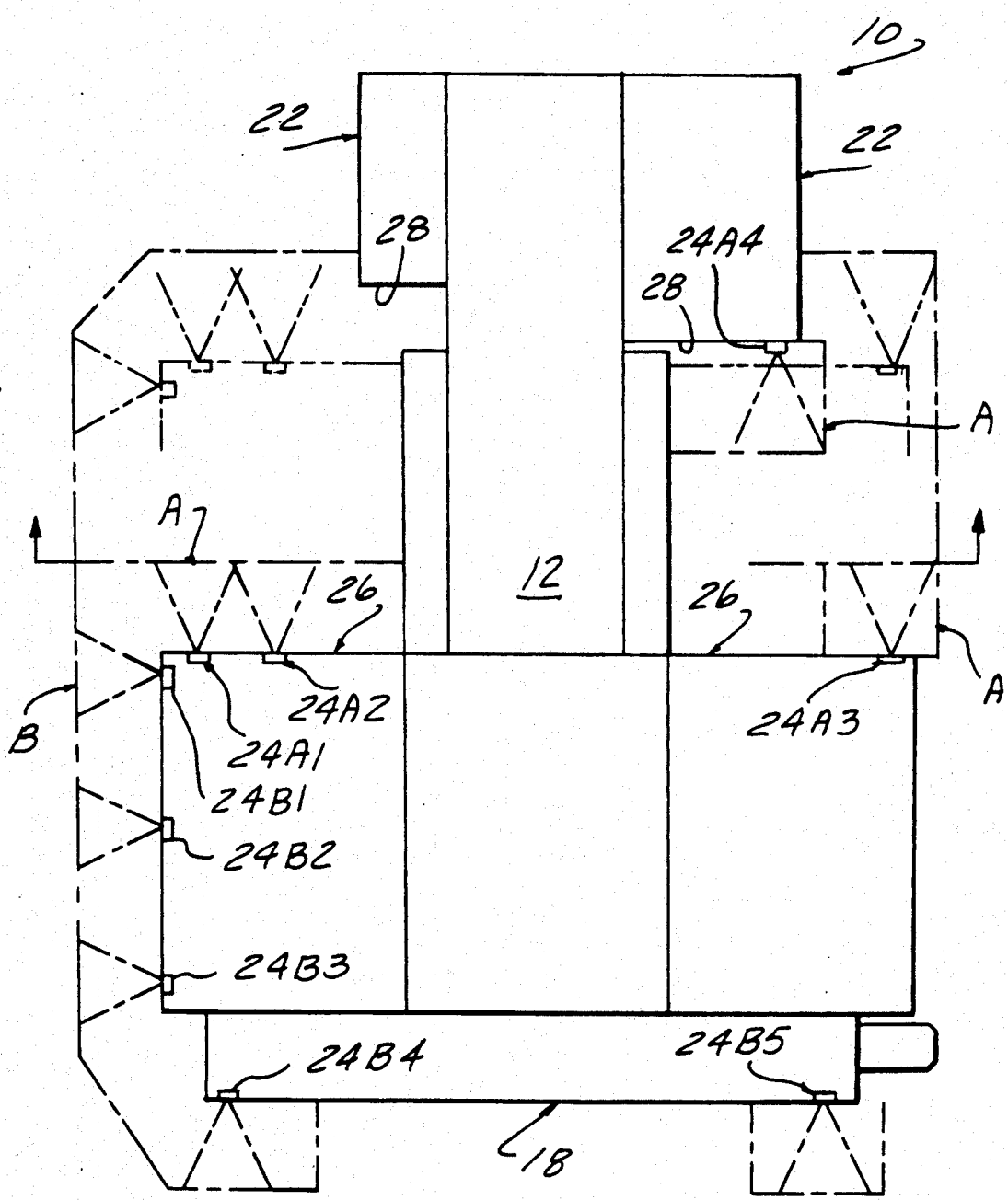
FIG. 2 is a diagrammatic plan representation of the ultrasonic transmitter-receiver arrangement on a punch press and feed table.

A typical installation pattern is shown in FIG. 2. Two sets of ultrasonic transmitter-receiver units 24A and 24B are employed. The first set of units 24A are installed in "pinch areas", i.e., zones between the leading side 26 of the table 18 and sides 28 of the fixed structure 22 facing the front side 26 of the table 18. This includes units 24-A1, -A2, -A3, -A4 fixed to sides 26, 28.

A second set of ultrasonic transmitter-receiver units 24B, -B2, -B3, -B4, and -B5 are fixed along the loading and the front sides of the table 18.

Thus, as the table 18 advances and retracts, shifting protected zones A, B are created, which allow entry in the spaces within the zone whenever the table postion is such that entry does not present a hazard to persons in those spaces, greatly reducing the incidence of false tripping.

The A and B zones present varying degrees of potential hazards and the press shutdown upon triggering of an A unit is of a more complete degree than when a B unit is triggered, an A unit triggered shutdown requiring a complete restart of a machine cycle, while the B unit shutdown can be restarted with a simple reset.

Figure 3:
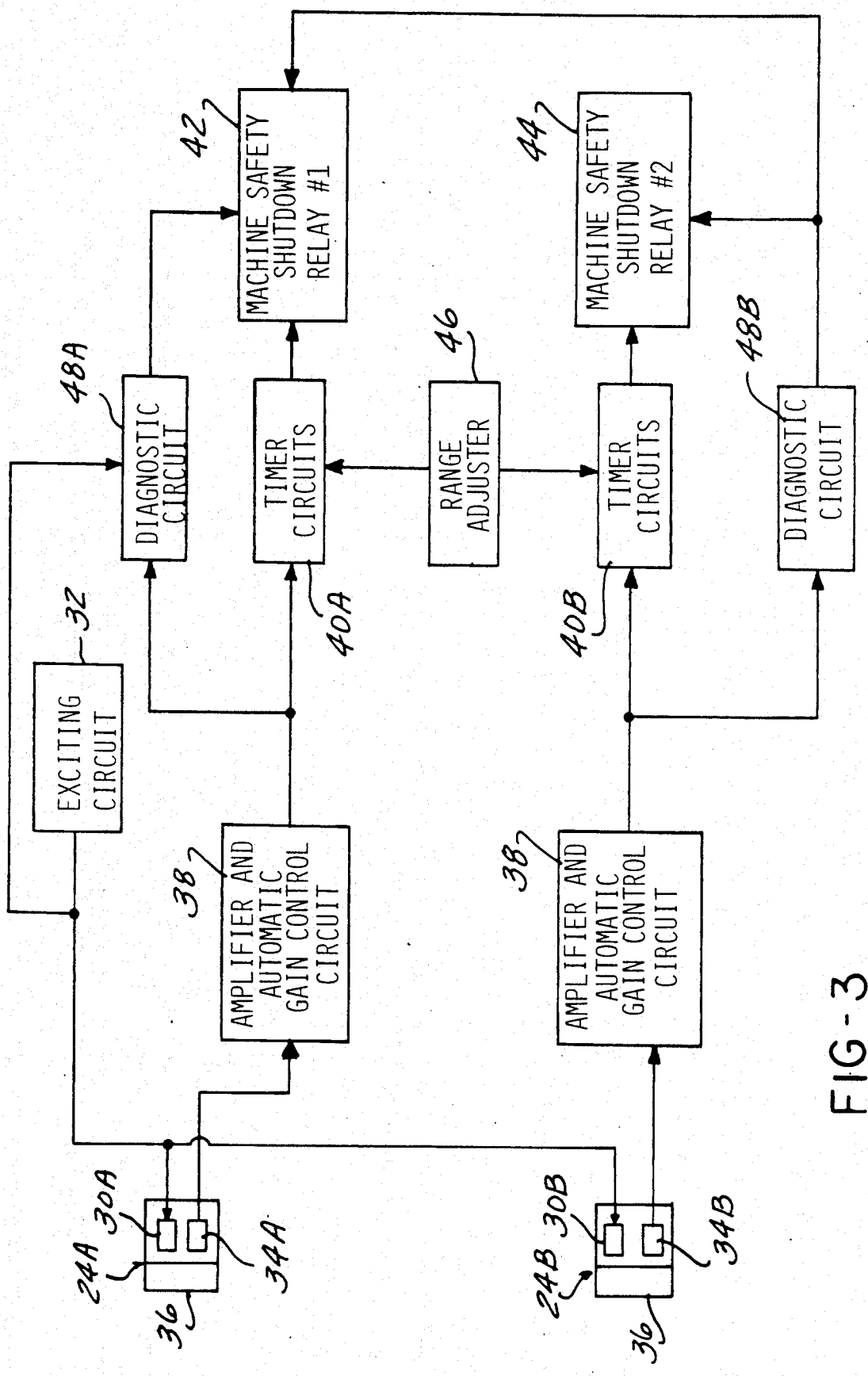
FIG. 3 is a block diagram of the electrical system associated with the ultrasonic transmitter-receiver sets used in the safety system according to the present invention.

FIG. 3 shows a block diagram of a safety system using two sets of ultrasonic transmitter-receivers 24A, 24B, a single unit 24A and 24B represented for illustrative purposes. Ultrasonic transmitter-receivers 24 of various types are well known, including electrical types, in which a piezoelectric transmitter 30 is periodically excited by an exciting circuit 32, impressing a short duration high frequency (i.e., 35 KHZ) voltage, causing a ultrasonic pulse to be periodically emitted from the transmitter. The exciting circuit, which can be a combination of a burst oscillator, and power monitor, preferably drives all of the transmitters 30 simultaneously to minimize crosstalk and system update time.

Each receiver 34A, 34B is positioned alongside the respective transmitter 24A, 24B to receive echoes of the transmitted pulse reflected from a person or object in front of the respective transmitter 24A, 24B.

A reference target, comprised of a bar 36 fixed close to each transmitter 30A, 30B is incorporated as part of the failsafe feature of the system. An echo from the bar 36 will only be received if the system is functioning properly.

Each receiver 34A, 34B may also comprise piezoelectric crystals generating a corresponding electrical signal when excited by an echo, which signal is amplified to a greater or lesser extent in an associated amplifying and automatic gain control circuit 38. A variable gain is necessary since echo signals are attenuated drastically depending on the distance of the reflecting surface. This distance can be determined by the time lag between transmission and receiving of a pulse, and a greater gain applied corresponding to the degree of attenuation caused by the distance traveled by the echo.

According to the concept of the present invention, a limited triggering range is established for the operation of each unit 24A, 24B, i.e., an echo received from an object within a range defined by a near point of a few inches to a far point on the order of 12-14 inches. This limited range is established by a timer circuit 40 which enables transmission of an echo detect signal only within preset times corresponding to these distances. The detect signals are transmitted to either a machine safety shutdown relay 42 or 44, depending on whether unit 24A or 24B echos generated the detect signal.

The relays 42,44 are held energized to enable the machine cycle to continue, but if a detect echo is received, the respective relay is deenergized, causing shutdown.

A range adjuster device 46 can be incorporated for varying the time "window" and thus the range of an echo transmitted as a detect signal.

As noted above, a failsafe operation is contemplated, so that any failure in the safety system results in a machine shutdown. This is accomplished by looking for the echo signal from the reference target 36 occurring very shortly after the transmission, i.e., after approximately 0.5 milliseconds. If a signal of normal strength is received, this verifies operability of the various components. Additionally a continuity check of the various cable leads is made, and a fault signal is generated by the diagnostic circuit 48A, 48B if an open lead is detected; or if there is an absence of a reference echo from the target 36 after each cycle. Such fault signal is applied to the machine safety relays 42, 44, to cause shutdown to thus achieve a failsafe mode of operation.

Figure 4:
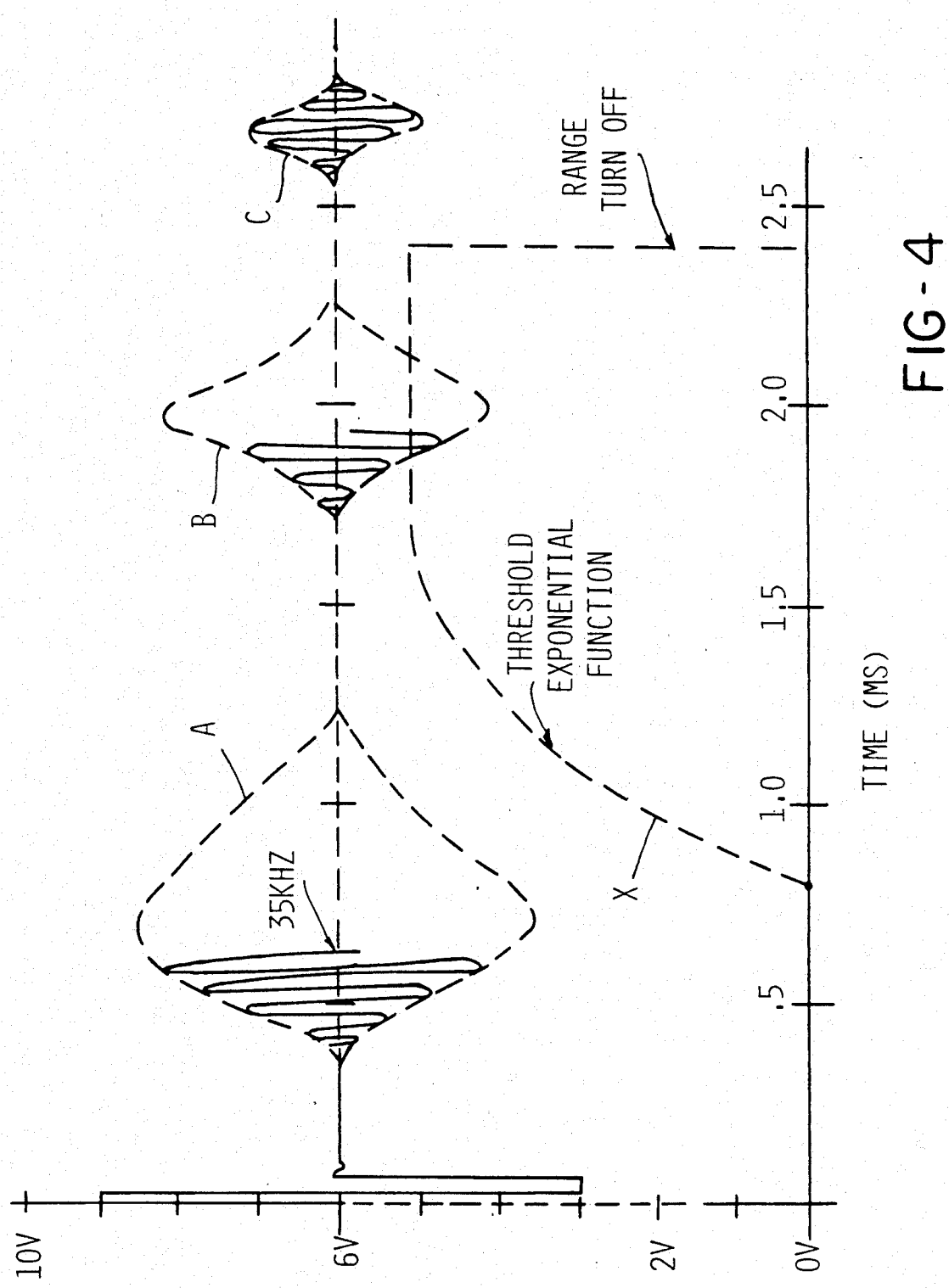
FIG. 4 is a plot of echo signals, illustrating the range of sensitivity to echo signals established by timing circuitry utilized in the system depicted in FIG. 3.

FIG. 4 shows a plot illustrating the operation of the timer circuits. The reference echo signal A occurs first shortly after the cycle begins.

A threshold exponential function X is applied which allows transmission of a detect signal of a predetermined magnitude after a predetermined time function, which goes to zero at a time corresponding to the maximum range of an object which will trigger machine shutdown, i.e., 12-14 inches.

Echo signals B at that time of a sufficient magnitude will thus result in transmission of a detect signal to the machine safety shutdown relays 42 or 44.

Echo signals C arriving at a later time from more distant objects do not fall in the envelope or result in transmission of a detect signal.

Thus, machine shutdown occurs only if an echo signal is received within the predetermined range established by the threshold function. Echo signals received in a time period outside that range do not result in a machine shutdown.

The predetermined range is set to be substantially less than the total range of movement of the table 18, yet of a sufficient distance to allow a safe stop to avoid a collision.

Thus, the entire pinch areas and adjacent side areas are protected, but only when the table position is such as to present a hazard, and shop personnel can enter these areas without triggering a shutdown as long as the table is out of range.

I claim:

1. A safety system for a machine tool of the type including a machining head and a table mounted adjacent said machining head for powered movement through a path extending along a region of said machine tool, towards and away from said machining head, and fixed structure adjacent said machining head, said table and fixed structure having sides projecting laterally to the side of said machining head to create pinch areas in which the leading side of the table moves towards said machining head, and a safety system for conditionally shutting down said machine tool upon intrusion of a person into said pinch areas, including means stopping said powered movement of said table, said safety system characterized by ultrasonic transmitter means periodically transmitting an ultrasonic pulse from said leading side of said table into said pinch area, ultrasonic receiver means for receiving echo signals from objects in the pinch area, and safety circuit means for triggering a machine tool shutdown including stopping said powered movement of said table upon receiving an echo signal from an object within an accurately predetermined range from said leading side of said table, said predetermined range being a small proportion of the extent of said powered movement of said table along said path towards and away from said fixed structure, said safety circuit means including timer means creating an interval of limited duration only during which interval an echo signal from a transmitted pulse will produce a machine shut down, whereby said safety circuit means is not responsive to echo signals from objects outside of said range to create a shifting safety zone substantially less than the extent of movement of said table along said path, and whereby entry of a person into portions of said pinch areas which are out of said safety zone does not result in a machine tool shut down.

2. The safety system according to claim 1 further including additional ultrasonic transmitter and receiver means mounted to one side of said table, transmitting an ultrasonic pulse and receiving echo signals from objects alongside, and said safety circuit means causing a shutdown of said machine tool including shut down of powered movement of said table upon receipt of an echo signal by said receiver means from an object within a predetermined range alongside said table.

3. The safety system according to claim 2 further including ultrasonic transmitter and receiver means mounted to the trailing side of said table, transmitting an ultrasonic pulse and receiving echo signals from objects to the rear of said table and safety circuit means causing a shutdown of said machine tool including powered movement of said table upon receipt of an echo signal by said receiver means from an object within a predetermined range behind said table.

4. The safety system according to claim 3 further including ultrasonic transmitting and receiver means attached to said fixed structure facing said table, transmitting an ultrasonic pulse and receiving echo signals from objects alongside and means causing a shutdown of said machine tool including shut down of powered movement of said table upon receipt of an echo signal by said receiver means from an object within a predetermined range of said fixed structure.

5. The safety system according to claim 4 wherein different degrees of machine shut down occur in response to said echo signal received by said ultrasonic receiver means on said leading side of said table than by said ultrasonic receiver means on said one side of said table.

6. The safety system according to claim 3 further including failsafe means shutting down said machine tool upon failure of any of said ultrasonic transmitting receiving means.

7. The safety system according to claim 2 wherein a plurality of ultrasonic transmitters and receivers are arrayed along one side of said table.

* * * * *